United States Patent
Duda (10) Patent No.: US 10,263,957 B2
(45) Date of Patent: Apr. 16, 2019

(54) SYSTEM AND METHOD FOR A FALLBACK ACCESS CONTROL LIST PORT CONFIGURATION

(71) Applicant: Arista Networks, Inc., Santa Clara, CA (US)

(72) Inventor: Kenneth James Duda, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 15/169,527

(22) Filed: May 31, 2016

(65) Prior Publication Data

US 2017/0346790 A1 Nov. 30, 2017

(51) Int. Cl.
H04L 29/06 (2006.01)

(52) U.S. Cl.
CPC ...... *H04L 63/0263* (2013.01); *H04L 63/0236* (2013.01); *H04L 63/101* (2013.01)

(58) Field of Classification Search
None
See application file for complete search history.

(56) References Cited

U.S. PATENT DOCUMENTS

| | | |
|---|---|---|
| 2009/0190591 A1 | 7/2009 | Sankaran |
| 2010/0122335 A1 | 5/2010 | Van Der Merwe et al. |
| 2014/0172918 A1* | 6/2014 | Kornmann .......... G06F 21/6218 707/785 |
| 2015/0341364 A1 | 11/2015 | Basso et al. |
| 2016/0072814 A1* | 3/2016 | Martinelli ............. H04L 63/101 726/1 |
| 2016/0094480 A1 | 3/2016 | Kulkarni et al. |
| 2017/0099347 A1* | 4/2017 | Pucha ................ H04L 67/1044 |

OTHER PUBLICATIONS

PCT International Search Report and Written Opinion for PCT International Appln No. PCT/US2017/033364 dated Aug. 22, 2017. (13 pages).
Cisco Systems, Inc., IEEE 802.1X with ACL Assignments, Jul. 17, 2012, See p. 1, lines 38-40; and p. 3, lines 5-6, 30-31.

* cited by examiner

*Primary Examiner* — Kaveh Abrishamkar
(74) *Attorney, Agent, or Firm* — Womble Bond Dickinson (US) LLP (57) ABSTRACT

A method and apparatus of a device that installs a new access control list for a port of a network element is described. In an exemplary embodiment, a network element receives an indication that the first access control list for the port is to be updated with a second access control list and the port processes data communicated with port with the first access control list. In addition, the network element configures the port to use a fallback access control list, where the fallback access control list includes a plurality of rules and the port uses the fallback access control list to process data communicated with the port. Furthermore, the network element loads the second access control list for the port. The network element additionally configures the port to use the second access control list, wherein the port uses the second access control list to process data communicated with the port.

27 Claims, 7 Drawing Sheets

SYSTEM AND METHOD FOR A FALLBACK ACCESS CONTROL LIST PORT CONFIGURATION

FIELD OF INVENTION

This invention relates generally to data networking and more particularly to configuration a fallback access control list for a port during an access control list reconfiguration for that port.

BACKGROUND OF THE INVENTION

Network element can support access control lists (ACLs) in order to block undesirable network traffic. An ACL is a series of rules, where each rule has a match criterion and an action. An ACL is applied to a piece of data by evaluating the data against these rules in order and taking the action of the first rule that matched. For example, a match criterion for each rule is a pair (V, M), where V is a numeric value up to N bits long and M is a mask of N 0 and 1 bits. A value X matches the rule if (X & M)==(V & M), where "&" is the bitwise "logical and" operator.

From time to time, the network element operator may change the specification of what traffic should be blocked or allowed by updating or replacing the rules of the ACL. To effect this change, the network element software loads the new ACL into the network element hardware, typically in the form of ternary content-addressable memory (TCAM) entries within a switch applicant specific integrated circuit (ASIC).

The challenge is that loading an ACL can take tens or even hundreds of milliseconds, during the time a large amount of traffic arrives at the switch. For example, if a large network element with 36 100 Gigabit per second port (Gbps) running at full speed, even tens of millisecond can still represent Gigabytes of data being processed by the network element. In this example, how can the network element forward this amount of traffic when the ACL is in the middle of being loaded? If the network element retains a complete copy of both the old and new ACL, the TCAM usage exceeds capacity in many applications. Others choices are to drop all traffic during the update, or to accept all traffic during the update.

Consider a use case where a web service provider connects to transit peers. Transit peer ports have ACLs that provide two functions: (1) block extremely harmful traffic, e.g. one transit peer spoofing another transit peer's routing session, or spoofing internal IP addresses; (2) distributed denial of service (DDOS) mitigation filters that reduce the severity of in progress DDOS attacks. Now, suppose the web service provider wishes to update the DDOS list. The DDOS list can be very long, so the old and new ACL cannot both fit in the TCAM. There are two bad choices. In deny all mode, the service provider would drop 10s or 100s of milliseconds of customer traffic while making the change. In contrast, in the permit all traffic, the provider would be exposed to very harmful attacks.

SUMMARY OF THE DESCRIPTION

A method and apparatus of a device that installs a new access control list for a port of a network element is described. In an exemplary embodiment, a network element receives an indication that the first access control list for the port is to be updated with a second access control list and the port processes data communicated with port with the first access control list. In addition, the network element configures the port to use a fallback access control list, where the fallback access control list includes a plurality of rules and the port uses the fallback access control list to process data communicated with the port. Furthermore, the network element loads the second access control list for the port. The network element additionally configures the port to use the second access control list, wherein the port uses the second access control list to process data communicated with the port.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that installs a new access control list for a port of a network element is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that installs a new access control list for a port of a network element is described. In one embodiment, a network element determines that an access control list (ACL) for a port is to be updated. Updating an ACL can take time (e.g., tens or hundreds of milliseconds) and during the update time, the port ACL is in a partial state. Instead of using a "deny all" or "allow all" rule when the port ACL is updated, the network element configures the port to use a fallback ACL during the port ACL update. In one embodiment, the fallback ACL is a set of two or more ACL rules that can deny some types of traffic and/or allow other types of traffic. In one embodiment, the fallback ACL can be a subset of the current port ACL, a different set of ACL rules that overlaps with the current port ACL rules, or a set of ACL rules that is disjoint with the current port ACL rules. In one embodiment, when the fallback ACL is configured on the port, the port uses the fallback ACL to process data received and transmitted by the port. The network element further loads the new ACL and configures the port to use new ACL, where the network element uses this new ACL to process data received and transmitted by the port.

Figure 1:
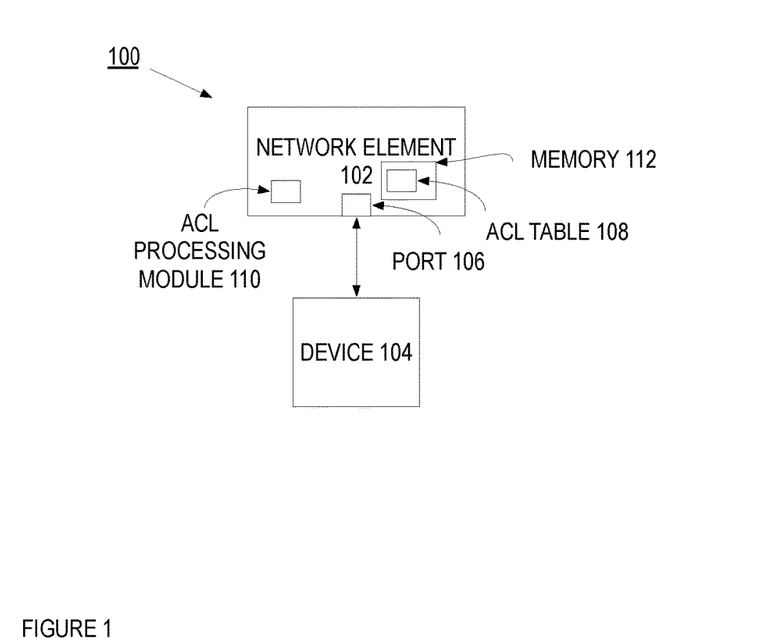
FIG. 1 is a block diagram of one embodiment of a network element that is coupled to a device and uses an Access Control List (ACL) for the port that couples the device and the network element.

FIG. 1 is a block diagram of one embodiment of a network element 102 that is coupled to a device 104 and uses an Access Control List (ACL) stored in an ACL table 108 for the port 106 that couples the device 104 and the network element 102. In FIG. 1, the system 100 includes the network element 102 that is coupled to the device 104. In one embodiment, the network element 102 is a device that provides network access to a network (e.g., physical network, virtualized network, etc.). A network element can be a switch, router, hub, bridge, gateway, etc., or any type of device that can allow access to a network. In one embodiment, the network element 102 can be a virtual machine. In one embodiment, the device 104 is any type of device that can communicate network data with another device (e.g., a personal computer, laptop, server, mobile device (e.g., phone, smartphone, personal gaming device, etc.), another network element, etc.). In one embodiment, the device 104 can be a virtual machine or can be a device that hosts one or more virtual machines.

In one embodiment, the network element 102 communicates network data with the device 104 via the port 106 using the ACL 108. In addition, the network element 102 includes an ACL processing module 110 that uses a fallback ACL when the ACL for the port is updated. In one embodiment, an ACL 108 can include of a series of rules, with each rule having a match criterion and an action. An ACL is applied to a piece of data of network traffic by evaluating the data against the rules in order and taking the action of the rule that matched. In one embodiment, the ACL is stored in memory 112. In one embodiment, the memory is a specialized memory, such as a ternary content accessible memory (TCAM). In this embodiment, the TCAM can further other types of information such as quality of service (QoS) maps and policy-based routing maps.

Figure 2:
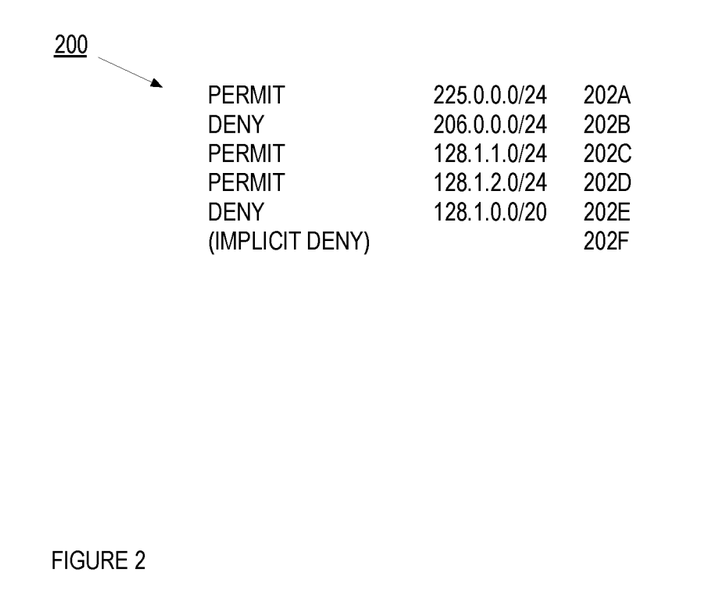
FIG. 2 is an illustration of one embodiment of an ACL, where the ACL includes permit and deny rules.

FIG. 2 is an illustration of one embodiment of an ACL 200, where the ACL includes permit and deny rules 202A-F. In FIG. 2, the ACL 200 includes rules 202A-F, where rule 202A is a permit for the pair (225.0.0.0, 24). In this embodiment, the range of addresses from 225.0.0.0 to 225.0.0.255 is permitted through this port and packets with addresses in this range are further processed by the network element (e.g., forwarded, or some other type of network processing). The next rule is rule 202B and is a deny rule for the pair (206.0.0.0, 24). This rule 202B denies addresses in the range of 206.0.0.0-206.0.0.255. The next two rules 202C-D are permits for the address range pairs (128.1.1.0, 24) and (128.1.2.0, 24), respectively. The result of rules 202C-E permits address ranges 128.1.1.0-128.1.2.255 and denies for the address ranges 128.1.0.0-128.1.0.255 and 128.1.3.0-128.1.255.255. Furthermore, there is an implicit deny rule 202F that denies all other address that are not accounted for in a preceding rules 202A-E. In one embodiment, the rules can be ordered or unordered. Ordered rules allows for higher precedence rules to overrule lower precedence rules. In another embodiment, the ACL rules can include permits or denies for different types of packet characteristics, such as source address, destination address, type of packet Transport Control Protocol (TCP), User Datagram Protocol (UDP), IP, Internet Control Message Protocol (IGMP), or some other type of packet), protocol, source and/or destination port number, differentiated services code point (DSCP) value, precedence value, and/or other types of packet characteristics. In one embodiment, an ACL rule can include a range for one or more of the packet characteristics.

As described above, a network element can support access control lists (ACLs) in order to block undesirable network traffic or allow desirable network traffic. From time to time, a network element administrator may change the specification of what traffic should be blocked by changing the rules of the ACL). To effect this change, the network element software has to load the new ACL into the data plane, which can be in the form of TCAM entries within a switch ASIC. Alternatively, the ACL can be stored in a different type of memory.

In one embodiment, the challenge is that loading a new ACL can take tens or even hundreds of milliseconds, during which a large amount of traffic is processed by the network element. How can the network element forward this traffic when the ACL is in the middle of being loaded? If the network element retains a complete copy of both the old and new ACL, the memory usage for the ACL table exceeds capacity in many applications (e.g., there is limited memory allocated in a TCAM for the ACL of a port). Additional choices are to drop all traffic during the update or to accept all traffic during the update.

Consider a use case where a web service provider connects to transit peers. In one embodiment, transit peer ports have ACLs that provide two functions (among other possible functions): (1) block harmful traffic, e.g. one transit peer spoofing another transit peer's routing session, or spoofing internal IP addresses; (2) distributed denial of service (DDOS) mitigation filters that reduce the severity of in progress DDOS attacks. In this embodiment, suppose the web service provider wishes to update the DDOS list. There are two bad choices. In one default mode (e.g., drop all), the web service provider would drop tens or hundreds of milliseconds of customer traffic while making the change. In the "allow all" mode, the web service provider would be briefly exposed to very harmful attacks. The DDOS list can be very long, so the old and new ACL cannot both fit in the memory allocated for the ACL.

To address this issue, in one embodiment, the network element can use a fallback ACL. A "fallback ACL" is an ACL that is effective during the time period that an ACL is being updated. In one embodiment, the fallback ACL is a separate ACL that is kept loaded in a section of the ACL table. In one embodiment, the fallback ACL is not used to process data communicated with the associated port. However, when the network element is changing from an old ACL to a new ACL, the network element configures the port to use the fallback ACL, deletes the old ACL, loads the new ACL, and configures the port to use the new ACL.

In one embodiment, the fallback ACL for a port is a set of two or more ACL rules that can give a manner of protection and network traffic processing for network traffic communicated by the port that the "allow all" or "deny all" rules do not. In one embodiment, the fallback ACL can be a subset of the rules used for the current (or new) ACL. Alternatively, the fallback ACL can include one or more rules that are not part of the current (or new) ACL. For example and in one embodiment, the fallback ACL includes a subset of ACL rules that are used to secure network element and/or network associated with the network element. In this example, the set of rules can includes one or more rules that block insecure protocols (e.g., telnet). As another example, a service provider includes a three-tier system that includes a web server, business logic server, and a database server. In this example, the web server faces the public side of the network and the business logic and database servers are on the private side of the network. With this network topology, the fallback ACL allows access to the to the web server, blocks access to the business logic and database servers. Alternatively, the fallback ACL blocks other transit peers from spoofing routing IP session or addresses. In one embodiment, there can be different fallback ACLs for some or all of the ports, or there can be one fallback ACL for all of the ports.

In one embodiment, with a fallback ACL, the network element neither drops all network traffic processed by the port nor allows all of the network traffic to pass through. In this embodiment, each packet processed by the port is ACL checked with one of the old ACL, the fallback ACL, or the new ACL.

With a fallback ACL and in the example of the web service provider given above, the web service provider now has an answer to the problem of how to protect the port when the ACL for the port is updated. In one embodiment, the fallback ACL is a subset of the old ACL and includes rules to block the harmful attacks, such as transit peers that are spoofing routing IP sessions or addresses without having the large list of DDOS mitigation rules. The old and new ACLs consist of that ACL conjoined with the DDOS mitigation list. When using this type of fallback ACL, there is a brief period where servers are exposed to a higher volume of DDOS traffic, potentially slowing down some services, but the internal services are not exposed to spoofing attacks.

Figure 3:
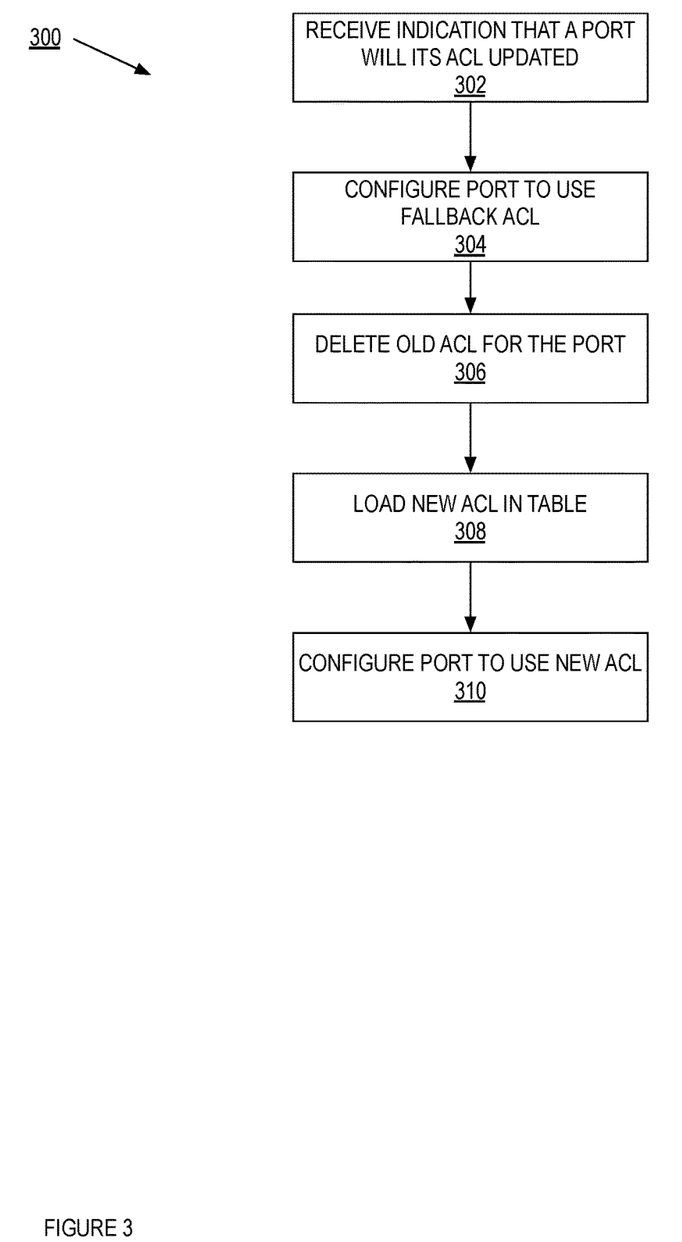
FIG. 3 is a flow diagram of one embodiment of a process to use a fallback ACL during configuration of the ACL for a port.

FIG. 3 is a flow diagram of one embodiment of a process 300 to use a fallback ACL during configuration of the ACL for a port. In one embodiment, an ACL processing module performs process 300, such as the ACL processing module 110 as described in FIG. 1 above. In Figure, process 300 begins by receiving an indication that a port will have the ACL for that port updated. In one embodiment, each port has a separate ACL that can be stored in one or more ACL tables. In this embodiment, this port is configured using the current ACL and will have a new ACL configured for this port. In one embodiment, the new ACL can differ by one rule, some of the rules, or all of the rules. In one embodiment, the new ACL replaces the old ACL, which can take 10s or 100s of milliseconds of time for process 300 to replace the old ACL with the new ACL. In one embodiment, in order to give some protection to this port during the time process 300 uses to update the ACL for the port, process 300 configures the port to use a fallback ACL. At block 304, process 300 configures the port to use the fallback ACL for processing data while process 300 replaces the current ACL for this port with the new ACL. In one embodiment, the fallback ACL is a set of multiple rules that is used to protect the port during the ACL update. In this embodiment, the fallback ACL is a smaller set of rules that can be used to protect a core set of functionality during the port ACL update. For example and in one embodiment, the fallback ACL can be a subset of the rules used for the current (or new) ACL. Alternatively, the fallback ACL can include one or more rules that are not part of the current (or new) ACL. In one embodiment, the fallback ACL is installed in the ACL table for the port and is not removed while the network element is running whether this port is using the fallback ACL or the regular ACL. In this embodiment, process 300 updates a reference to the ACL table for the port to point to the fallback ACL section of the table instead of the ACL section of the ACL table.

Figure 4:
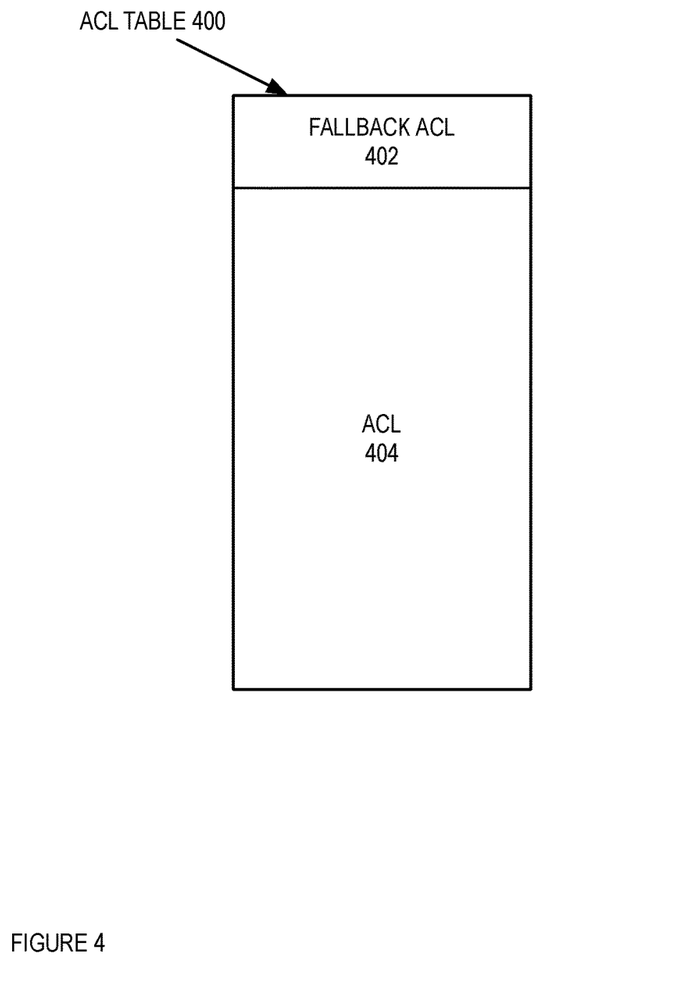
FIG. 4 is an illustration of one embodiment of an ACL table for a port that includes a fallback ACL section and ACL section.

At block 306, process 300 deletes the old ACL from the ACL table for the port. In one embodiment, process 300 deletes the ACL from the ACL section of the ACL table for the port. In one embodiment, process 300 removes the old ACL from the ACL section of the ACL table invalidating each entry in the ACL section of the ACL table. For example and in one embodiment, process 300 goes entry by entry in the ACL section and marks a "valid" flag of that entry to "false", causing the network element to disregard the entry in subsequent matching. In this example, with each entry marked as invalid, the old ACL is no longer effective and the ACL entries can be used for other purposes. Process 300 loads the new ACL in the ACL section of the ACL table at block 308. In one embodiment, process 300 loads the ACL section of the ACL table by inserting each rule from new ACL into a table entry and updating any metadata for the ACL section of the ACL table. At block 310, process 300 configures the port to use the new ACL for the port. In one embodiment, process 300 updates a reference for the ACL table for the port to point to the ACL section of the table instead of the fallback section of the ACL table As described above, the ACL table for a port can include a fallback ACL and an ACL. FIG. 4 is an illustration of one embodiment of an ACL table 400 for a port that includes a fallback ACL section 402 and ACL section 404. In one embodiment, the fallback ACL 402 is installed in the fallback ACL section 402 of the ACL table prior to the ACL in the ACL section 404 being updated. In a further embodiment, the fallback ACL remains resident in the fallback ACL section once installed during the normal operation of the network element until the fallback ACL is updated or deleted. In another embodiment, the fallback ACL can be installed in the fallback ACL section on demand (e.g., in response to receiving an indication to update the ACL). In this embodiment, in response to the network element receiving an indication that the ACL in the ACL section is to be updated, a fallback ACL is installed in the fallback ACL section and a reference to the ACL for this port is switched to refer to the fallback ACL. While in one embodiment, the fallback ACL 402 is illustrated as being a contiguous part of the ACL table 400, in alternate embodiments, the fallback ACL 402 is stored in memory that is non-contiguous with the current ACL 404. In one embodiment, both the fallback ACL 402 and ACL 404 can be stored in the same type of memory, such as a TCAM. In an alternate embodiment, the fallback ACL 402 and ACL 404 can be stored in different types of memories. For example and in one embodiment, the ACL 404 can be stored in the a TCAM and the fallback ACL 402 can be stored in another type of memory (e.g. dynamic random access memory (DRAM) or another type of memory).

While in one embodiment, the embodiments described above are for using a fallback ACL when an ACL for a port is being updated, in alternate embodiments, the embodiments described above can be used for updating other types of tables, such as QoS maps, policy-based route maps, and/or other types of policy sets. For example and in one embodiment, a fallback QoS map for a port can be used when a current QoS map for this port is being updated. In this example, the network element configures the port to use a fallback QoS when the current QoS map is being updated and configures the port to use the updated QoS map after the network element completes the update of the QoS map. In a further embodiment, a fallback policy-based route map for a port can be used when a current policy-based route map for this port is being updated. In this example, the network element configures the port to use a fallback policy-based route when the current policy-based route map is being updated and configures the port to use the updated policy-based route map after the network element completes the update of the policy-based route map. In yet another embodiment, a fallback policy for a port can be used when a set of policy entries for the port in the TCAM is being updated (e.g., overwritten) by the network element, where the process of overwriting the set of policy entries leaves this policy in an incomplete state that may comprise the security or integrity of the network element and/or the functionality of the network element. In this embodiment, the network element configures the port to use the fallback policy during the update of the set of policy entries and further configures the port use the updated set of policy entries after the update is complete.

Figure 5:
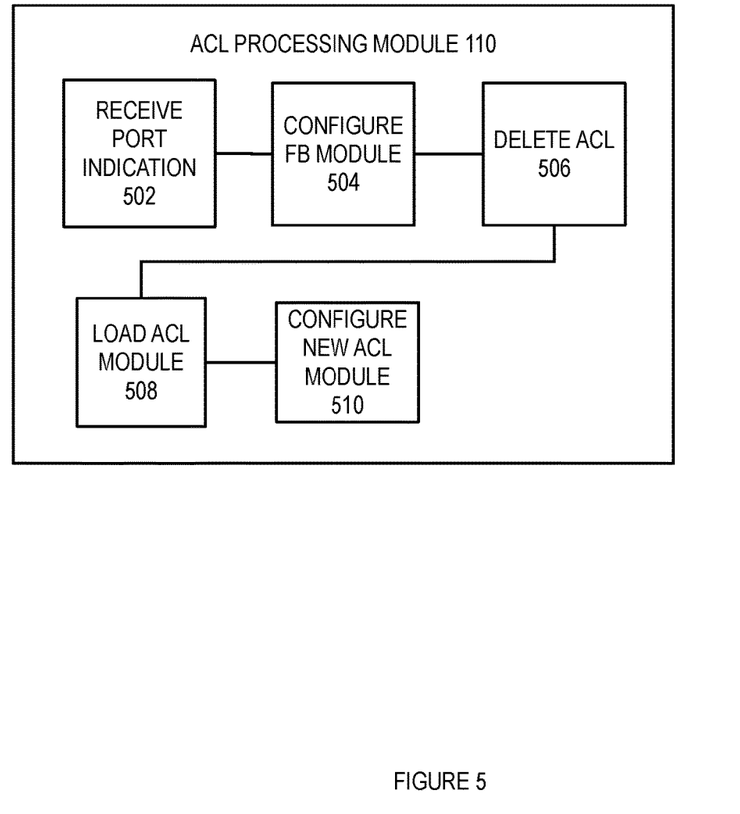
FIG. 5 is a block diagram of an ACL processing module that uses a fallback ACL during configuration of the ACL for a port.

FIG. 5 is a block diagram of an ACL processing module 110 that uses a fallback ACL during configuration of the ACL for a port. In one embodiment, the ACL processing module includes a receive port indication module 502, configure fallback module 504, delete ACL module 506, load ACL 508, and configuration new ACL module 510. In one embodiment, the receive port indication module 502 receives the port indication as described in FIG. 3, block 302 above. The configure fallback module 504 configures the fallback ACL as described in FIG. 3, block 304 above. The delete ACL module 506 deletes the current ACL in the ACL table as described in FIG. 3, block 306 above. The load ACL 508 loads the new ACL in the ACL table as described in FIG. 3, block 308 above. The configuration new ACL module 510 configures the port to use the new ACL as described in FIG. 3, block 310 above.

Figure 6:
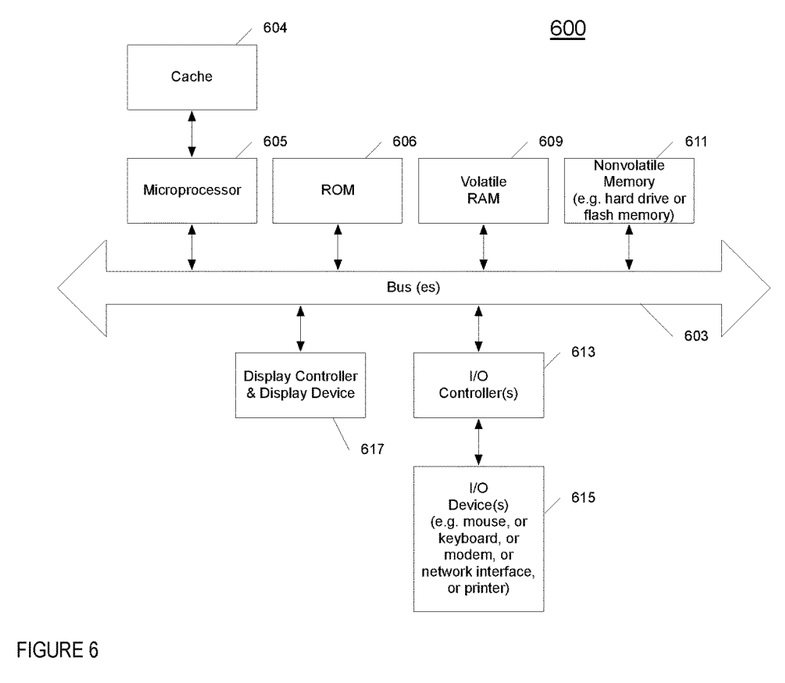
FIG. 6 illustrates one example of a typical computer system, which may be used in conjunction with the embodiments described herein.

FIG. 6 shows one example of a data processing system 600, which may be used with one embodiment of the present invention. For example, the system 600 may be implemented including a network element 102 as shown in FIG. 1. Note that while FIG. 6 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 6, the computer system 600, which is a form of a data processing system, includes a bus 603 which is coupled to a microprocessor(s) 605 and a ROM (Read Only Memory) 607 and volatile RAM 609 and a non-volatile memory 611. The microprocessor 605 may retrieve the instructions from the memories 607, 609, 611 and execute the instructions to perform operations described above. The bus 603 interconnects these various components together and also interconnects these components 605, 607, 609, and 611 to a display controller and display device 615 and to peripheral devices such as input/output (I/O) devices which may be mice, keyboards, modems, network interfaces, printers and other devices which are well known in the art. In one embodiment, the system 600 includes a plurality of network interfaces of the same or different type (e.g., Ethernet copper interface, Ethernet fiber interfaces, wireless, and/or other types of network interfaces). In this embodiment, the system 600 can include a forwarding engine to forward network date received on one interface out another interface.

Typically, the input/output devices 615 are coupled to the system through input/output controllers 617. The volatile RAM (Random Access Memory) 609 is typically implemented as dynamic RAM (DRAM), which requires power continually in order to refresh or maintain the data in the memory.

The mass storage 611 is typically a magnetic hard drive or a magnetic optical drive or an optical drive or a DVD RAM or a flash memory or other types of memory systems, which maintain data (e.g. large amounts of data) even after power is removed from the system. Typically, the mass storage 611 will also be a random access memory although this is not required. While FIG. 6 shows that the mass storage 611 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 603 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
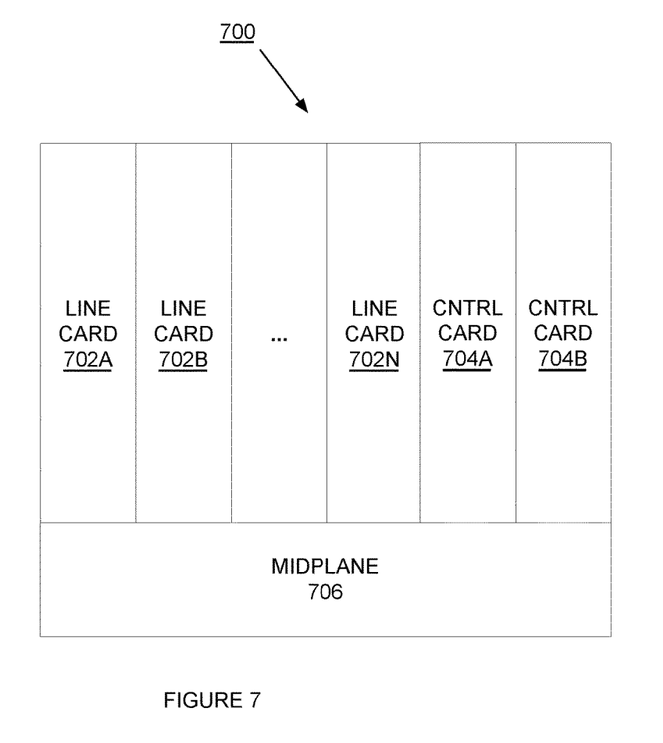
FIG. 7 is a block diagram of one embodiment of an exemplary network element that uses a fallback ACL during configuration of the ACL for a port.

FIG. 7 is a block diagram of one embodiment of an exemplary network element 700 that uses a fallback ACL during configuration of the ACL for a port. In FIG. 7, the midplane 706 couples to the line cards 702A-N and controller cards 704A-B. While in one embodiment, the controller cards 704A-B control the processing of the traffic by the line cards 702A-N, in alternate embodiments, the controller cards 704A-B, perform the same and/or different functions (e.g., using a fallback ACL during configuration of the ACL for a port, etc.). In one embodiment, the line cards 702A-N process and forward traffic according to the network policies received from controller cards the 704A-B. In one embodiment, the controller cards 704A-B uses a fallback ACL during configuration of the ACL for one or more of the ports of one of the line cards 702A-N as described in FIG. 4. In this embodiment, one or both of the controller cards includes the ACL processing module to use a fallback ACL during configuration of the ACL for a port, such as the ACL processing module 110 as described in FIG. 1 above. In another embodiment, the line cards 702A-N con uses a fallback ACL during configuration of the ACL on one or more of the ports of the respective line card 702A-N that does the ACL conversion as described in FIG. 4. It should be understood that the architecture of the network element 700 illustrated in FIG. 7 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "configuring," "receiving," "configuring," "loading," "sending," "forwarding," "storing," "adding," "returning," "communicating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units perform a method to install a new access control list for a port of a network element, the method comprising:

receiving an indication that the first access control list for the port is to be updated with a second access control list and the port processes data communicated with port with the first access control list;

configuring the port to use a fallback access control list, wherein the fallback access control list includes a plurality of rules, wherein the first access control list is stored in a first section of an access control list table, the fallback access control list is stored in a second section of the access control list table, and the configuring is accomplished by updating a reference to the access control list table to point to the second section;

loading the second access control list into the first section for the port, wherein during the loading, the port uses the fallback access control list to process data communicated with the port; and configuring the port to use the second access control list, wherein the port uses the second access control list to process data communicated with the port and the configuring is accomplished by updating a reference to the access control list table to point to the first section.

2. The non-transitory machine-readable medium of claim 1, wherein an access control list is a set of rules that affects the processing of the data communicated for the port, where each of the set of rules is selected from the group consisting of a permit rule and a deny rule.

3. The non-transitory machine-readable medium of claim 2, wherein each of the set of rules includes an action that is selected from the group consisting of a permit rule and a deny rule.

4. The non-transitory machine-readable medium of claim 2, wherein each of the set of rules operates on a characteristic of the data.

5. The non-transitory machine-readable medium of claim 2, wherein the data characteristic is selected from the group consisting of source address, destination address, packet type, protocol, source port number, destination port number, differentiated services code point value, and precedence value.

6. The non-transitory machine-readable medium of claim 5, wherein the packet type is selected from the group consisting of Transport Control Protocol, User Datagram Protocol, Internet Protocol, and Internet Control Message Protocol.

7. The non-transitory machine-readable medium of claim 1, wherein the fallback access control list is a subset of the first access control list.

8. The non-transitory machine-readable medium of claim 1, wherein the loading of the second access list further comprises:
overwriting at least part of the first access list.

9. The non-transitory machine-readable medium of claim 1, wherein the at least one of the first and second access control lists is stored in a ternary content accessible memory.

10. The non-transitory machine-readable medium of claim 9, wherein the ternary content accessible memory further stores another item selected from the group selected consisting of a quality of service map and a policy-based routing map.

11. A method to install a new access control list for a port of a network element, the method comprising:
receiving an indication that the first access control list for the port is to be updated with a second access control list and the port processes data communicated with port with the first access control list;
configuring the port to use a fallback access control list, wherein the fallback access control list includes a plurality of rules, wherein the first access control list is stored in a first section of an access control list table, the fallback access control list is stored in a second section of the access control list table, and the configuring is accomplished by updating a reference to the access control list table to point to the second section;
loading the second access control list into the first section for the port, wherein during the loading, the port uses the fallback access control list to process data communicated with the port; and
configuring the port to use the second access control list, wherein the port uses the second access control list to process data communicated with the port and the configuring is accomplished by updating a reference to the access control list table to point to the first section.

12. The method of claim 11, wherein an access control list is a set of rules that affects the processing of the data communicated for the port, where each of the set of rules is selected from the group consisting of a permit rule and a deny rule.

13. The method of claim 12, wherein each of the set of rules includes an action that is selected from the group consisting of a permit rule and a deny rule.

14. The method of claim 12, wherein each of the set of rules operates on a characteristic of the data.

15. The method of claim 12, wherein the data characteristic is selected from the group consisting of source address, destination address, packet type, protocol, source port number, destination port number, differentiated services code point value, and precedence value.

16. The method of claim 15, wherein the packet type is selected from the group consisting of Transport Control Protocol, User Datagram Protocol, Internet Protocol, and Internet Control Message Protocol.

17. The method of claim 11, wherein the fallback access control list is a subset of the first access control list.

18. A network element to install a new access control list for a port of a network element, the network element comprising:
a port;
a processor;
a memory coupled to the processor though a bus; and
a process executed from the memory by the processor that causes the processor to receive an indication that the first access control list for the port is to be updated with a second access control list and the port processes data communicated with port with the first access control list, configure the port to use a fallback access control list, wherein the fallback access control list includes a plurality of rules, wherein the first access control list is stored in a first section of an access control list table, the fallback access control list is stored in a second section of the access control list table, and the configuring is accomplished by updating a reference to the access control list table to point to the second section, load the second access control list into the first section for the port, wherein during the loading, the port uses the fallback access control list to process data communicated with the port, and configure the port to use the second access control list, wherein the port uses the second access control list to process data communicated with the port and the configuring is accomplished by updating a reference to the access control list table to point to the first section.

19. The network element of claim 18, wherein an access control list is a set of rules that affects the processing of the data communicated for the port, where each of the set of rules is selected from the group consisting of a permit rule and a deny rule.

20. The network element of claim 19, wherein each of the set of rules includes an action that is selected from the group consisting of a permit rule and a deny rule.

21. The network element of claim 19, wherein each of the set of rules operates on a characteristic of the data.

22. The network element of claim 19, wherein the data characteristic is selected from the group consisting of source address, destination address, packet type, protocol, source port number, destination port number, differentiated services code point value, and precedence value.

23. The network element of claim 18, wherein the fallback access control list is a subset of the first access control list.

24. A non-transitory machine-readable medium having executable instructions to cause one or more processing units perform a method to install a new policy list for a port of a network element, the method comprising:

receiving an indication that the first policy list for the port is to be updated with a second policy list and the port processes data communicated with port with the first policy list;

configuring the port to use a fallback policy list, wherein the fallback policy list includes a plurality of rules, wherein the first policy list is stored in a first section of an access control list table, the fallback policy list is stored in a second section of the access control list table, and the configuring is accomplished by updating a reference to the access control list table to point to the second section;

loading the second policy list into the first section for the port, wherein during the loading, the port uses the fallback policy list to process data communicated with the port; and     configuring the port to use the second policy list, wherein the port uses the second a policy list to process data communicated with the port and the configuring is accomplished by updating a reference to the access control list table to point to the first section.

25. The machine-readable medium of claim 24, wherein a policy list is selected from the group consisting of a quality of service map list and a policy-based routing list.

26. A method to install a new policy list for a port of a network element, the method comprising:

receiving an indication that the first policy list for the port is to be updated with a second policy list and the port processes data communicated with port with the first policy list;

configuring the port to use a fallback policy list, wherein the fallback policy list includes a plurality of rules, wherein the first policy list is stored in a first section of an access control list table, the fallback policy list is stored in a second section of the access control list table, and the configuring is accomplished by updating a reference to the access control list table to point to the second section;

loading the second policy list for the port, wherein during the loading, the port uses the fallback policy list to process data communicated with the port; and     configuring the port to use the second policy list, wherein the port uses the second a policy list to process data communicated with the port and the configuring is accomplished by updating a reference to the access control list table to point to the first section.

27. The method of claim 26, wherein a policy list is selected from the group consisting of a quality of service map list and a policy-based routing list.

\* \* \* \* \*